United States Patent
Beattie, Jr. et al.

(10) Patent No.: US 10,462,752 B2
(45) Date of Patent: Oct. 29, 2019

(54) TRANSMITTING CONTENT USING GUARD BAND FREQUENCIES AT REDUCED POWER

(71) Applicants: AT&T Intellectual Property I, L.P., Atlanta, GA (US); AT&T Mobility II LLC, Atlanta, GA (US)

(72) Inventors: James Gordon Beattie, Jr., Bergenfield, NJ (US); James Hollister, Camarillo, CA (US)

(73) Assignees: AT&T INTELLECTUAL PROPERTY I, L.P., Atlanta, GA (US); AT&T MOBILITY II LLC, Atlanta, GA (US)

( * ) Notice: Subject to any disclaimer, the term of this patent is extended or adjusted under 35 U.S.C. 154(b) by 0 days.

(21) Appl. No.: 15/828,951

(22) Filed: Dec. 1, 2017

(65) Prior Publication Data
US 2019/0174427 A1    Jun. 6, 2019

(51) Int. Cl.
*H04W 52/26* (2009.01)
*H04L 5/14* (2006.01)
*H04W 52/42* (2009.01)
*H04W 72/04* (2009.01)
*H04W 88/02* (2009.01)

(52) U.S. Cl.
CPC ............ *H04W 52/265* (2013.01); *H04L 5/14* (2013.01); *H04W 52/42* (2013.01); *H04W 72/044* (2013.01); *H04W 88/02* (2013.01)

(58) Field of Classification Search
CPC . H04W 52/265; H04W 72/044; H04W 52/42; H04W 88/02; H04L 5/14
See application file for complete search history.

(56) References Cited

U.S. PATENT DOCUMENTS

| | | |
|---|---|---|
| 7,457,625 B2 | 11/2008 | Krenik et al. |
| 7,949,343 B2 | 5/2011 | Kermoal et al. |
| 8,781,408 B2 | 7/2014 | Steer |
| 8,948,085 B2 | 2/2015 | Barbieri et al. |

(Continued)

FOREIGN PATENT DOCUMENTS

| | | |
|---|---|---|
| WO | 2016184277 A1 | 11/2016 |
| WO | 2017023030 A1 | 2/2017 |

OTHER PUBLICATIONS

Dietert, Jann Erik, Potential first steps in 5G New Radio, https://www.detecon.com/sites/default/files/op_5g_new_radio.pdf, Detecon Consulting, May 2017.

*Primary Examiner* — Brian D Nguyen
(74) *Attorney, Agent, or Firm* — Amin, Turocy & Watson, LLP

(57) ABSTRACT

The described technology is generally directed towards transmitting content in a guard band (marginal/edge) spectrum, in which the power level corresponds to a frequency associated with the transmission. One or more criteria such as a desired quality of service level of the content to transmit, measured noise data and so on are used to select a guard band frequency/power level for the transmission. The content transmission within this spectrum, at a lower downlink sector power level that protects adjacent channel users, allows delivery of multicast/broadcast content to a broad population of devices in an area, for example, and frees up primary carrier channels for other communications such as voice and high speed data communications.

20 Claims, 12 Drawing Sheets

(56) References Cited

U.S. PATENT DOCUMENTS

| | | |
|---|---|---|
| 9,088,989 B2 | 7/2015 | Smith et al. |
| 9,313,665 B2 | 4/2016 | El-refaey et al. |
| 9,615,260 B2 | 4/2017 | Rashid et al. |
| 2004/0166802 A1 | 8/2004 | McKay et al. |
| 2006/0160551 A1* | 7/2006 | Matoba ................. H04W 16/14 455/509 |
| 2006/0205342 A1 | 9/2006 | Mckay et al. |
| 2009/0147735 A1* | 6/2009 | Ghosh .................... H04W 8/30 370/329 |
| 2012/0314630 A1 | 12/2012 | Walker et al. |
| 2013/0114529 A1 | 5/2013 | Chen et al. |
| 2014/0073339 A1 | 3/2014 | Yang |
| 2014/0181537 A1* | 6/2014 | Manne ................. G06F 1/3296 713/300 |
| 2015/0085801 A1 | 3/2015 | Samarasooriya et al. |
| 2016/0021661 A1 | 1/2016 | Yerramalli et al. |
| 2016/0249224 A1 | 8/2016 | Prasad et al. |
| 2016/0315712 A1* | 10/2016 | Vassilieva ............ H04B 10/564 |
| 2017/0156140 A1 | 6/2017 | Islam et al. |
| 2017/0215170 A1 | 7/2017 | Islam et al. |
| 2017/0238265 A1* | 8/2017 | Yang ................... H04W 52/241 455/522 |
| 2018/0164864 A1* | 6/2018 | Peffers ............... G01R 31/2879 |
| 2018/0212698 A1* | 7/2018 | Sun ....................... H04L 5/0053 |
| 2018/0270851 A1* | 9/2018 | Bhattad ............ H04W 72/1289 |
| 2018/0317180 A1* | 11/2018 | Li ...................... H04W 52/242 |
| 2018/0324017 A1* | 11/2018 | Liu ......................... H04L 27/26 |
| 2018/0331798 A1* | 11/2018 | Nammi ................ H04L 5/0042 |
| 2019/0007884 A1* | 1/2019 | Koskinen ............. H04W 36/30 |

\* cited by examiner

TRANSMITTING CONTENT USING GUARD BAND FREQUENCIES AT REDUCED POWER

TECHNICAL FIELD

The subject application is related to wireless communication systems, and, for example, to transmitting content in a wireless communication system using unused edge spectrum frequencies.

BACKGROUND

In mobile communications, there are many types of information transmitted to user equipment other than voice and data for conventional interactive services. Such other information often has relatively modest quality of service requirements coupled with communal broadcast or multicast bit rate requirements.

With contemporary packet scheduling, there is a consistent flow of such other (e.g., bulk) information over standard bearer channels, which leads to the overcommitment of conventional physical resource blocks to meet each individual device's communications requirements. Reduced voice and data capabilities can result from using these physical resource blocks for bulk information communications.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
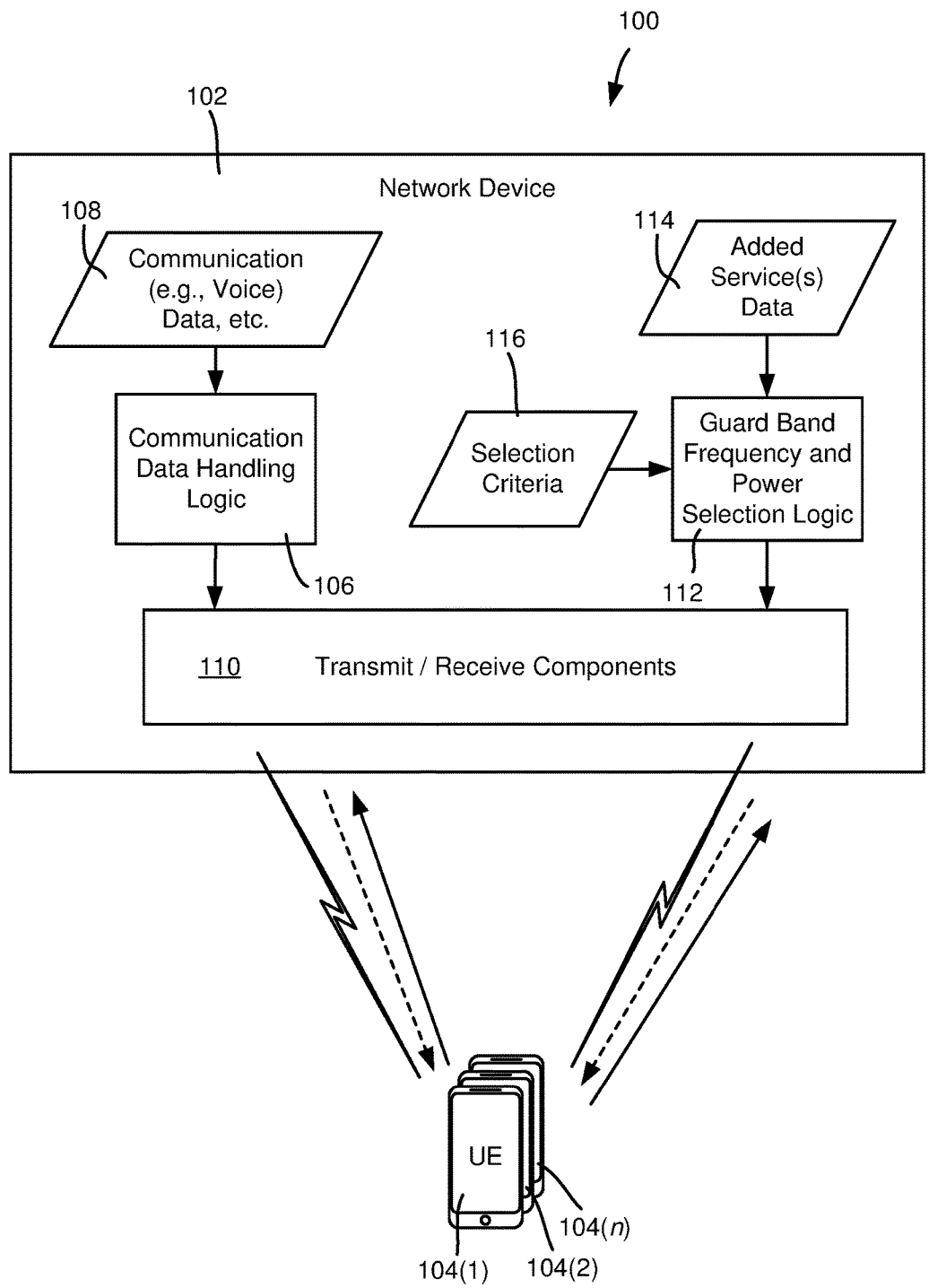
FIG. 1 illustrates an example wireless communication system in which a network node device and user equipment (UE) can implement various aspects and implementations of the subject disclosure.

Briefly, one or more aspects of the technology described herein are generally directed towards using the edge (marginal) spectrum, that is, a spectrum currently reserved as an unused guard band, to deliver multicast/broadcast content to a broad population of devices in an area. In general, the technology lowers the downlink power level as the signals approach the edge of the operational carrier's licensed spectrum (the edge of the guard band), which protects adjacent channel users.

As used herein with respect to guard bands, the term "frequency" refers to a certain selected frequency within a guard band for transmitting communications, such as a center frequency for a communications signal with some range of frequencies above and below the center frequency. Note that a guard band may be divided into frequency-based channels, however there is no requirement that such channels be the same bandwidth/evenly spaced. For example, one type of data may need more bandwidth than another type of data, and thus for example the guard band may be dynamically allocated into center frequencies having different bandwidths as needed, and reallocated as desired. For purposes of brevity, the term "channel" may be used herein with respect to a guard band center frequency with a chosen bandwidth selected for transmitting information, however it is understood that channels as used herein may or may not be evenly spaced, and/or may or may not be the same bandwidth as each other.

Further, a guard band frequency that is being used may be shared, such as by time division, code division and so on. Thus, for example, a frequency being used for transmitting one type of information may be used for transmitting another type of information in a shared manner.

One or more guard band channels can be one-way with respect to communications, e.g., with a "best effort" form of quality of service (QoS). One or more guard band channels can be associated with a conventional backchannel to request retransmissions embedded in the broadcast stream, or be sent to a specific device over another bearer channel to the device.

The technology implements a downlink scheme that transmits from a sector at a reduced power level gradually trending toward zero as the edge of the licensed spectrum is approached. Further, the actual transmitter power from the sector can be based on the "empty channel" noise measured at the site (and possibly adjacent site data) obtained in background operations so as to minimize potential interference.

In this way, the marginal spectrum is useable for additional, lower power, narrowband multicast/broadcast carriers. Examples of information transmitted include low-resolution video and audio streams, software and reference data updates, community alerts, traffic and weather reports and so on. As can be readily appreciated, this provides opportunities to sell value added services, such as media downloads for the Internet of Things (IoT), connected car data, mobile devices, weather and traffic alerts, and so on, possibly providing new pricing options for subscribers that do not need maximum speed or constant data flow options for certain information.

Enabling adjacent spectrum operation using guard bands to carry low latency/speed communications frees up the primary channels (existing Physical Resource Blocks) and results in better voice and data capabilities for such conventional interactive services. This may correlate with a cost savings alternative to having full channel capabilities not needed for such low throughput needs.

It should be understood that any of the examples and terms used herein are non-limiting. For instance, the technology may be implemented in 4G as well as New Radio (NR, sometimes referred to as 5G) communications between a user equipment exemplified as a smartphone or the like and network device; however virtually any communications devices may benefit from the technology described herein. Further, the various types of information indicated as suitable for transmission over guard band frequencies are not limited to those exemplified herein. Thus, any of the embodiments, aspects, concepts, structures, functionalities or examples described herein are non-limiting, and the technology may be used in various ways that provide benefits and advantages in radio communications in general.

FIG. 1 illustrates an example wireless communication system 100 in accordance with various aspects and embodiments of the subject technology. In one or more embodiments, the system 100 can comprise a network device 102 (e.g., a network node) and one or more user equipment UEs 104(1)-104(n).

In various embodiments, the system 100 is or comprises a wireless communication network serviced by one or more wireless communication network providers. In example embodiments, a UE 104(1) can be communicatively coupled to the wireless communication network via the network device 102/network node (e.g., network node device). The network device 102 can communicate with the UEs 104(1)-104(n), thus providing connectivity between the UEs 104(1)-104(n) and the wider cellular network.

In example implementations, a UE such as the UE 104(1) is able to send and/or receive communication data via a wireless link to the network device 102. The dashed arrow lines from the network device 102 to the UEs 104(1)-104(n) represent downlink (DL) communications and the solid arrow lines from the UEs 104(1)-104(n) to the network device 102 represent uplink (UL) communications.

The system 100 can further include one or more communication service provider networks that facilitate providing wireless communication services to various UEs, including the UEs 104(1)-104(n), via the network device 102 and/or various additional network devices (not shown) included in the one or more communication service provider networks. The one or more communication service provider networks can include various types of disparate networks, including but not limited to: cellular networks, femto networks, picocell networks, microcell networks, internet protocol (IP) networks Wi-Fi service networks, broadband service network, enterprise networks, cloud based networks, and the like. For example, in at least one implementation, system 100 can be or include a large scale wireless communication network that spans various geographic areas. According to this implementation, the one or more communication service provider networks can be or include the wireless communication network and/or various additional devices and components of the wireless communication network (e.g., additional network devices and cell, additional UEs, network server devices, etc.).

The network device 102 can be connected to the one or more communication service provider networks via one or more backhaul links. For example, the one or more backhaul links can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links can also include wireless link components, such as but not limited to, line-of-sight (LOS) or non-LOS links which can include terrestrial air-interfaces or deep space links (e.g., satellite communication links for navigation).

The wireless communication system 100 can employ various cellular systems, technologies, and modulation schemes to facilitate wireless radio communications between devices (e.g., the UE 104(1) and the network device 102). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 etc. For example, the system 100 can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices (e.g., the UEs 102 and the network device 104) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, the system 100 can be configured to provide and employ 5G wireless networking features and functionalities. With 5G networks that may use wave-forms that split the bandwidth into several sub-bands, different types of services can be accommodated in different sub-bands with the most suitable waveform and numerology, leading to an improved spectrum utilization for 5G networks. Notwithstanding, in the mmWave spectrum, the millimeter waves have shorter wavelengths relative to other communications waves, whereby mmWave signals can experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications; MIMO can be used for achieving diversity gain, spatial multiplexing gain and beamforming gain.

Note that using multi-antennas does not always mean that MIMO is being used. For example, a configuration can have two downlink antennas, and these two antennas can be used in various ways. In addition to using the antennas in a 2×2 MIMO scheme, the two antennas can also be used in a diversity configuration rather than MIMO configuration. Even with multiple antennas, a particular scheme might only use one of the antennas (e.g., LTE specification's transmission mode 1, which uses a single transmission antenna and a single receive antenna). Or, only one antenna can be used, with various different multiplexing, precoding methods etc.

The MIMO technique uses a commonly known notation (M×N) to represent MIMO configuration in terms number of transmit (M) and receive antennas (N) on one end of the transmission system. The common MIMO configurations used for various technologies are: (2×1), (1×2), (2×2), (4×2), (8×2) and (2×4), (4×4), (8×4). The configurations represented by (2×1) and (1×2) are special cases of MIMO known as transmit diversity (or spatial diversity) and receive diversity. In addition to transmit diversity (or spatial diversity) and receive diversity, other techniques such as spatial multiplexing (comprising both open-loop and closed-loop), beamforming, and codebook-based precoding can also be used to address issues such as efficiency, interference, and range.

In FIG. 1, as described herein, the exemplified network device 102 includes or is coupled to communication data handling logic 106, which provides for conventional communication of data 108, e.g., voice, high resolution video, audio and so forth. Transmit/receive components 110 may operate in a conventional manner to communicate bidirectionally with the user equipment 102.

As described herein, the exemplified network device 102 further includes guard band frequency and power selection logic 112 for transmitting added services data 114 to the user equipment over one or more guard band frequencies. As described herein, one or more selection criteria 116, such as a desired quality of service level associated with the type of data may factor into which guard band frequency is selected for a data transmission. The data transmission may be multicast, broadcast or directed to as little as a single user equipment, and may be one directional or bidirectional. Note that for bidirectional communication, a return communication from a user equipment need not be in a guard band frequency spectrum, but rather can use the main carrier spectrum.

Figure 2:
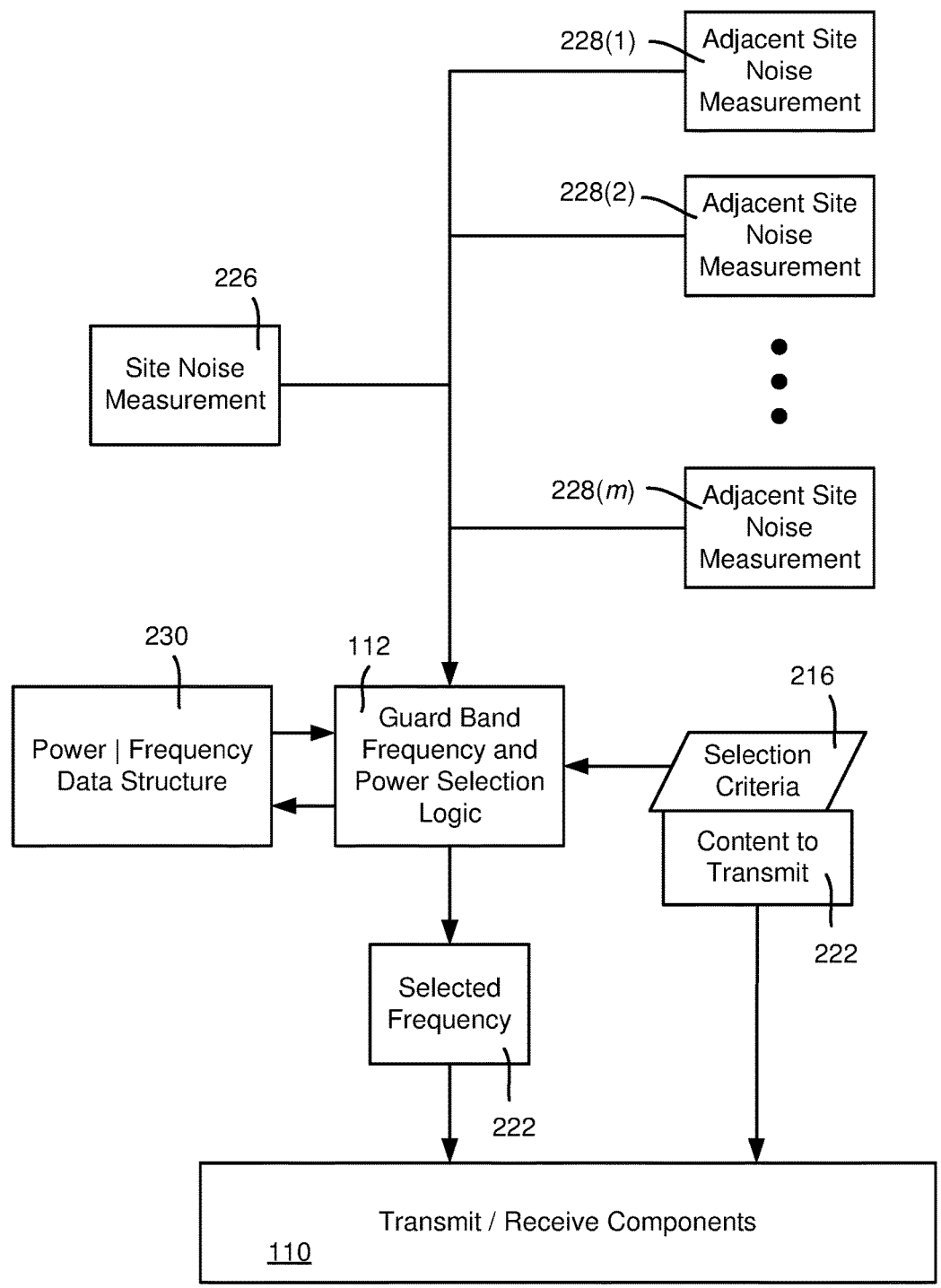
FIG. 2 illustrates a block diagram example of components and logic that may be used to select a guard band frequency and associated transmission power level based on various criteria, in accordance with various aspects and implementations of the subject disclosure.

FIG. 2 represents various aspects that may be considered by the guard band frequency and power selection logic 112 in deciding what frequency (e.g., center frequency/channel) to use for a data communication. As set forth herein, the transmission power level decreases the closer that the selected frequency gets to the edge of the carrier spectrum, e.g., as the selected frequency approaches the very edge of the guard band. Thus, one selection criteria 216 may be a desired quality of service level associated with a particular type of content to transmit 222; for example a higher desired quality of service may be associated with a higher power level, which thus factors into the frequency 224 that is selected. As there are some technical physical limits to operating adjacent to carriers, power limits as "Not to exceed xx dBm or dBc to adjacent carrier" or the like may be specified. For example, because most transmitters already fall under a −60 dBc requirement for adjacent channels, the adjacent carrier (in the guard band) cannot operate below approximately −50 dBc of the primary carrier. This can provide an adequate (not optimal) level of operation for most devices that are operating in this environment. Operating lower than this likely impairs the function itself and thus would negate the ability of the device to operate. If the guard band channels are further away, that number can be increased as well.

Further, the power level that is needed may be adjusted based on measured noise data. The noise data may be measured at the site (block 226) from which the data is to be transmitted to one or more user equipment within that site's corresponding cell, as well as adjacent site noise measurement data (blocks 228(1)-228(m)). Note that these noise data measurements need not be weighted the same, e.g., adjacent site noise measurements may not be given as much weight as the present site's noise data. For example, the needed transmission power level may be increased to compensate for measured noise, whereby the frequency that is selected needs to be one that can support at least that power level.

By way of example, and not limitation, a power adjustment protocol or interpretation may be based upon knowing the transmission power on the host equipment (as determined by adjacent power limits). For example, if based on a maximum power of 23 dBm, that equates to "0 dB" correction. For every decibel of power reduced to accommodate the adjacent power limits, the mobile device transmission can be attenuated to maintain path balance maximum transmission levels. Power control for operational needs can be adjustable for minimum power needed to perform data services not to exceed maximum permissible power, as determined by the analysis of the host transmitter power(s).

The frequency-to-power level association relationships may be determined empirically and/or calculated in any suitable manner. These association data may for example be maintained in a power/frequency data structure 230 such as a table. The guard band frequency and power selection logic may read the data structure 230 to find a suitable frequency once the needed power is obtained/determined.

Figure 3:
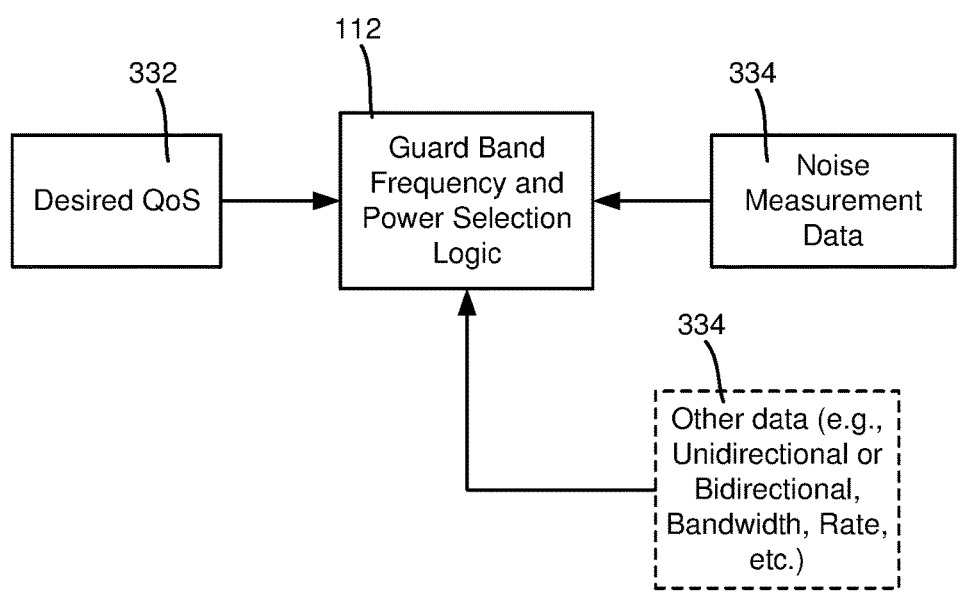
FIG. 3 illustrates a block diagram example of one or more criteria and/or other factors that may be used in making a frequency and power level selection, in accordance with various aspects and implementations of the subject disclosure.

For example, as shown in FIG. 3, this may be based on a quality of service level 332 (if any) associated with the content to transmit and the current noise measurement data 334. Any other data 338 may be used by the guard band frequency power selection logic 112 as power level and/or frequency selection criteria. Examples of other criteria may include whether a content transmission is unidirectional or bidirectional, broadcast or multicast, how much bandwidth is needed, the rate (e.g., amount of data per time slice) and so on.

Another factor that may determine the frequency to be used is whether a suitable frequency is available for data transmission or is currently in use for other data transmission(s). For example, for content A the guard band frequency and power selection logic 112 may have previously chosen a channel (a center frequency with a suitable bandwidth) for that type of content A, and (assuming the frequency is not able to be shared) thus cannot again choose that guard band channel for content B unless and until content A no longer needs to be transmitted. As can be readily appreciated, for any guard band frequency, the power frequency data structure 230 can record (e.g., as written by the guard band frequency in power selection logic 112) which guard band frequency (along with its allocated bandwidth) is currently unavailable for use, which is available for use in a shared manner only (and if so any limitations on rate and the like), which is fully available, and so on.

Figure 4:
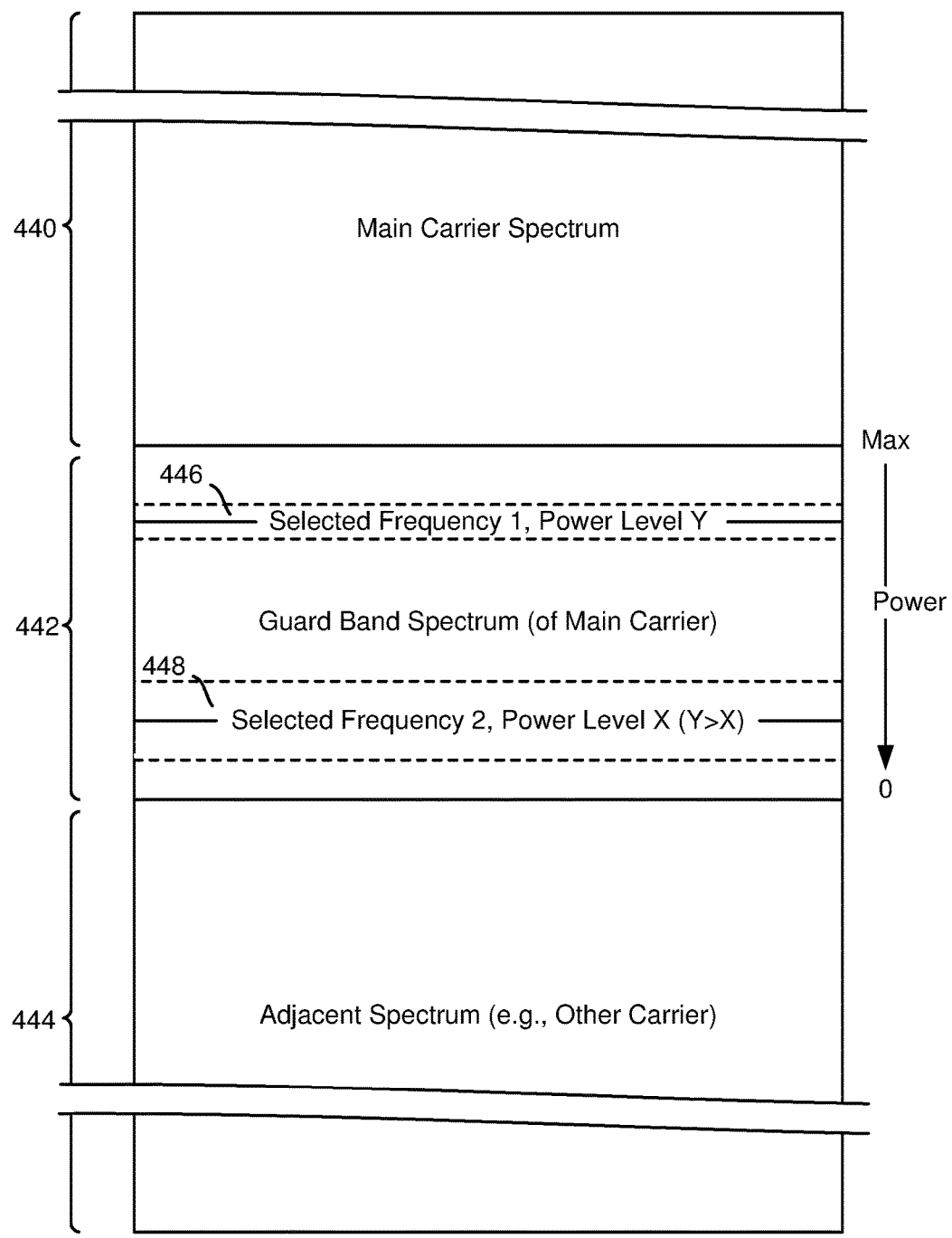
FIG. 4 is an example representation of a main carrier spectrum a guard band spectrum having selected transmission frequencies therein and an adjacent spectrum, in accordance with various aspects and implementations of the subject disclosure.

FIG. 4 represents a band of frequencies (shown vertically) divided into a main carrier spectrum 440, a guard band spectrum 442 (belonging to the main carrier) and an adjacent spectrum 444 such as of some other entity, e.g., another carrier (although it is also feasible for the same carrier to own or license the main and adjacent spectrum, but separate them for different purposes). The adjacent spectrum typically has a guard band spectrum (not separately shown), and there is typically a guard band spectrum at the other end of the main carrier spectrum, (also not shown).

As represented in FIG. 4, the guard band spectrum 442 has two selected frequency ranges (e.g., channels) 446 and 448 for transmission, namely selected frequency 1 at power level Y (indicated by the dashed lines corresponding to range 446) and selected frequency 2 at power level X (indicated by the dashed lines corresponding to range 448). Because the power level goes down as the selected frequency approaches the adjacent spectrum 444, it is noted that power level Y is greater than power level X.

Also shown in FIG. 4 are different bandwidths associated with the selected frequencies, e.g. selected frequency one represented by the range of frequencies 446 is narrower than the range of frequencies 448 centered at selected frequency 2. Note that this is only one alternative, and channels of same size frequency ranges may be used.

Figure 5:
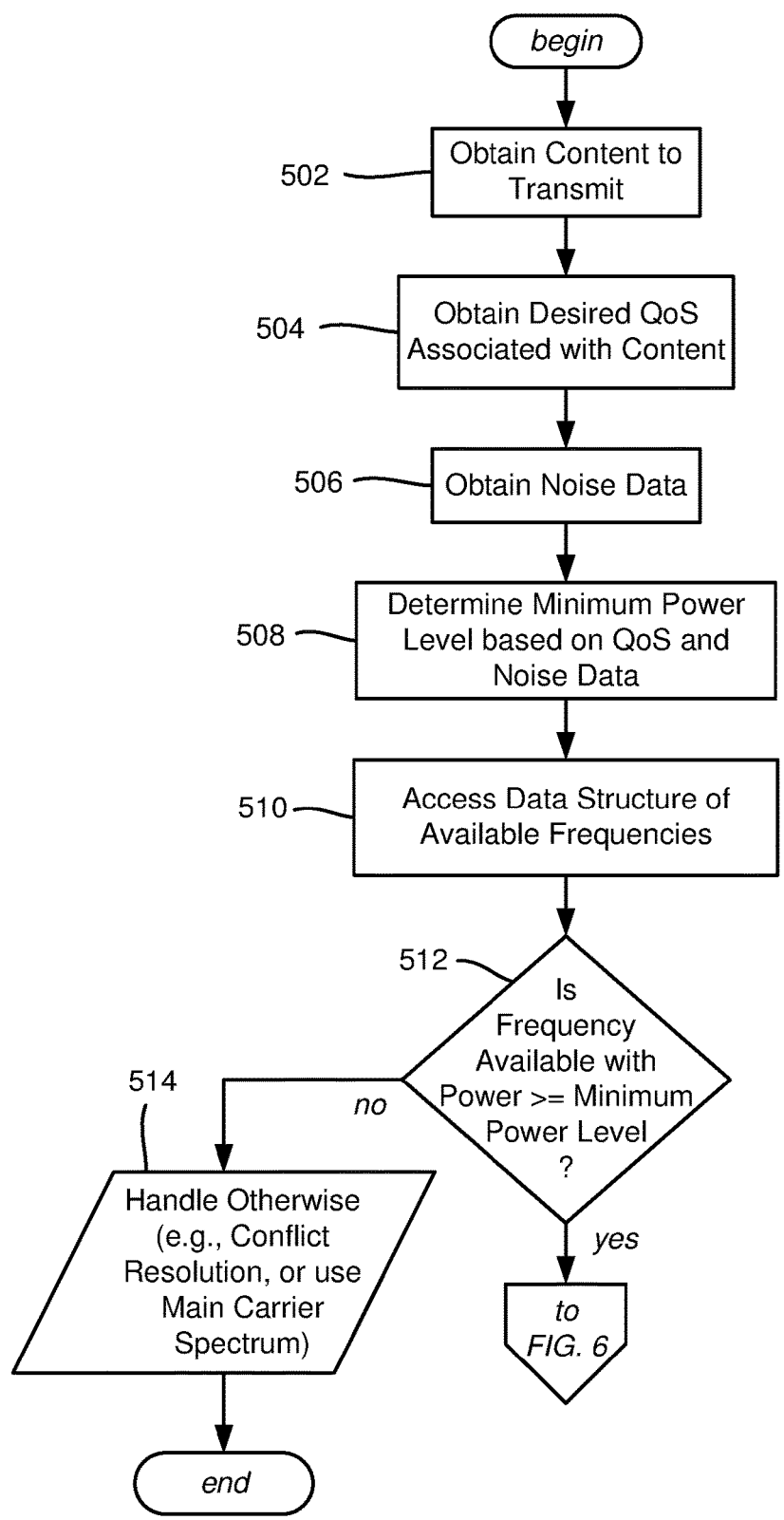
FIGS. 5 and 6 comprise an example flow diagram for selecting a guard band frequency and associated power level for transmitting content, in accordance with various aspects and implementations of the subject disclosure.
Figure 6:
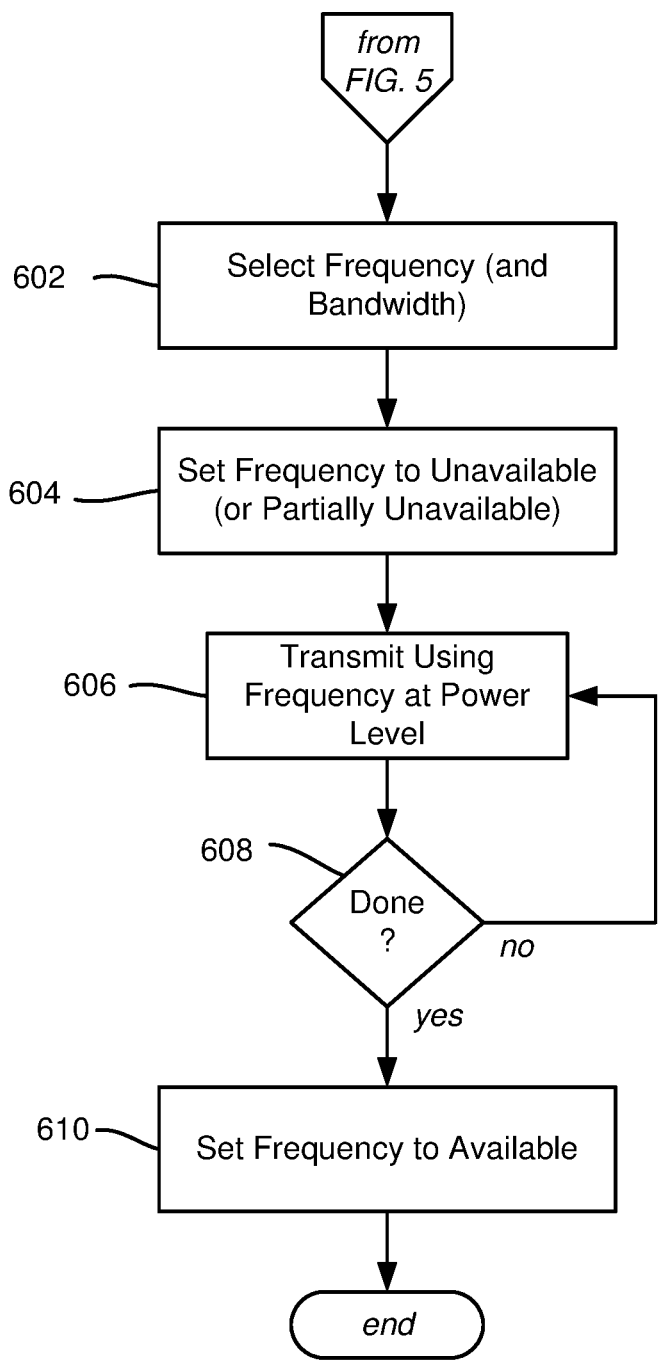

FIGS. 5 and 6 shows example logic in the form of operations exemplified as steps that may be used to select a frequency (e.g., If a center frequency along with suitable bandwidth, if bandwidth this not fixed). Step 502 of FIG. 5 represents obtaining the content to transmit, which may be provided by any appropriate source. Step 504 represents obtaining the desired quality of service level associated with the content. Note that the default level may be present if one is not specified.

Step 506 represents obtaining the noise data, e.g., measured at the site and one or more adjacent sites. Based on the noise data and the quality of service level a minimum power level needed for the transmission is determined (step 508). For example this may be a mathematical computation or obtained from lookup tables or the like and so on. Once the minimum power level is determined, a frequency that is capable of supporting that power level is selected.

To select the frequency, one alternative is to have the power and frequency selection logic access the data structure of power levels and frequencies (step 510) to determine via step 512 whether a frequency is available to handle transmission of the content. Note that if no such frequency is available, step 514 represents handling the problem, e.g., by conflict resolution (cancel transmission of lower priority content), using the main carrier spectrum, or some other solution such as to schedule transmission of the content when a suitable frequency becomes available.

If a suitable frequency exists, the process continues to step 602 of FIG. 6 which selects a frequency to use, (and if not fixed, the bandwidth on either side). One way to select the frequency is to use the closest frequency to the adjacent carrier spectrum that meets the needed power level requirements; in this way, content transmission does not consume a frequency that a content transmission needing more power can use.

Step 604 represents the logic setting the frequency (e.g., the upper and lower frequencies corresponding to the bandwidth) as unavailable, or partially unavailable if the frequency range can be shared, which if already being shared may make the entire frequency unavailable.

Steps 606 and 608 perform the content transmission using the selected frequency at the corresponding power level. When done, step 610 sets the frequency back to available, or at least the shared part of the frequency corresponding to the content transmission.

Figure 7:
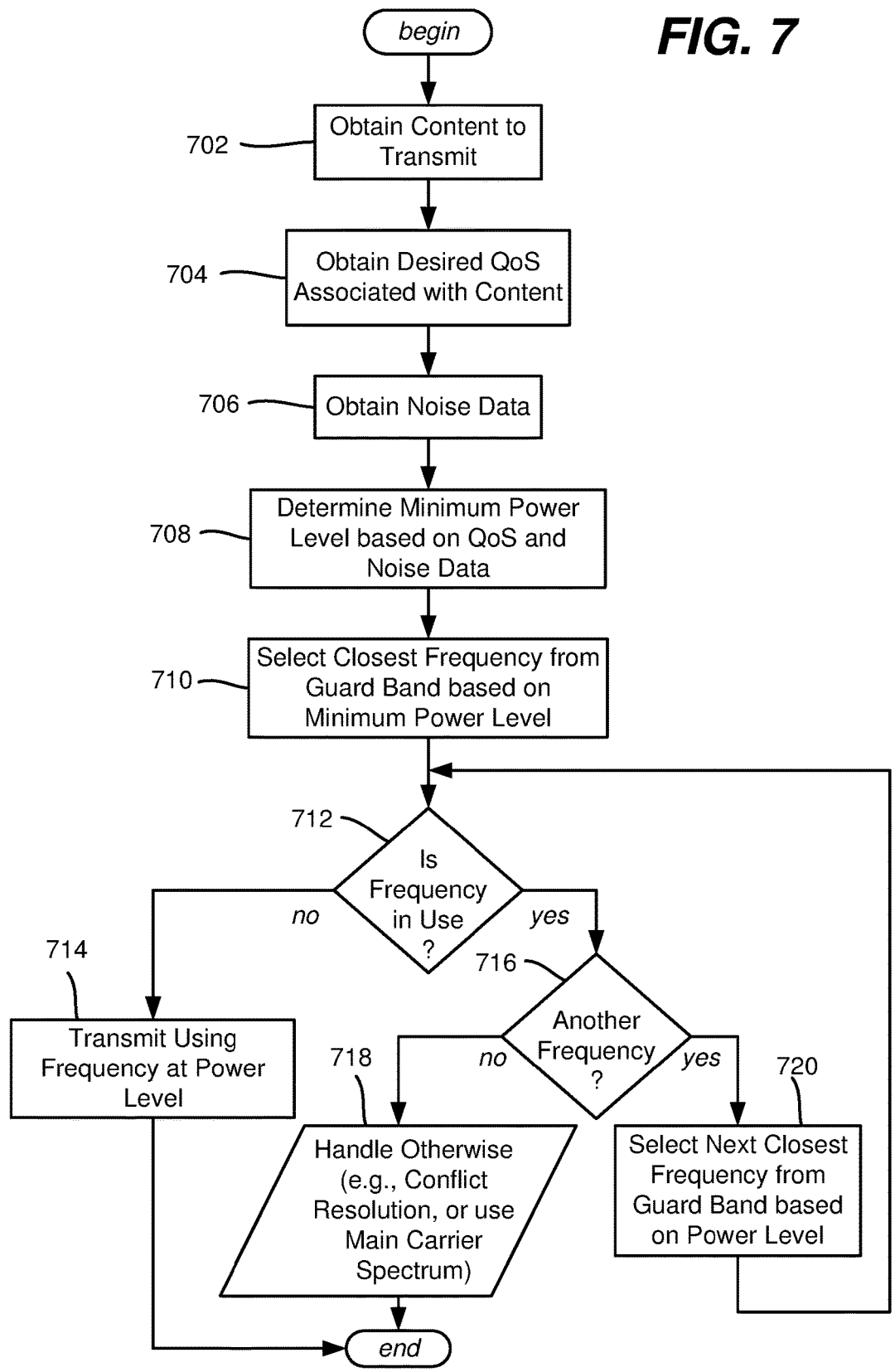
FIG. 7 illustrates an example flow diagram comprising alternative logic for selecting a guard band frequency and associated power level for transmitting content, in accordance with various aspects and implementations of the subject disclosure, in accordance with various aspects and implementations of the subject disclosure.

FIG. 7 shows alternative selection logic in the form of operations exemplified as steps that look for an available frequency starting from the minimum power level needed. Note that step 702 through steps 708 are at least generally similar to those of steps 502 through steps 508 of FIG. 5 and are thus not described separately herein.

Step 710 starts the frequency selection process based on the minimum power level needed for the content transmission by selecting the frequency appropriate for the minimum power level and determining if that frequency (including the needed bandwidth) is in use. If not, step 714 transmits the content at that frequency and the frequency's associated power level for as long as needed.

If the frequency at step 712 is in use, step 712 branches to step 714 to look for another frequency, e.g., at a higher power level. If no such other frequency exists, step 718 results the problem in a similar way to step 514 described above with reference to FIG. 5. Otherwise, step 720 selects the next closest frequency/higher power level and so on until a frequency is found that can be used or none remain to be evaluated.

As can be seen, by using the unused marginal guard band spectrum, e.g., adjacent an existing carrier, at a lower downlink sector power level, the technology can leverage additional capabilities while increasing spectrum efficiency and the monetization of valuable spectrum resources. The devices and services operating in these marginal downstream segments of the spectrum can benefit from the support of "push" type of services, such as advertising, software and data updates, vehicle traffic, emergency alerts (Amber, Sigalert, Weather, etc.) and low resolution video.

Figure 8:
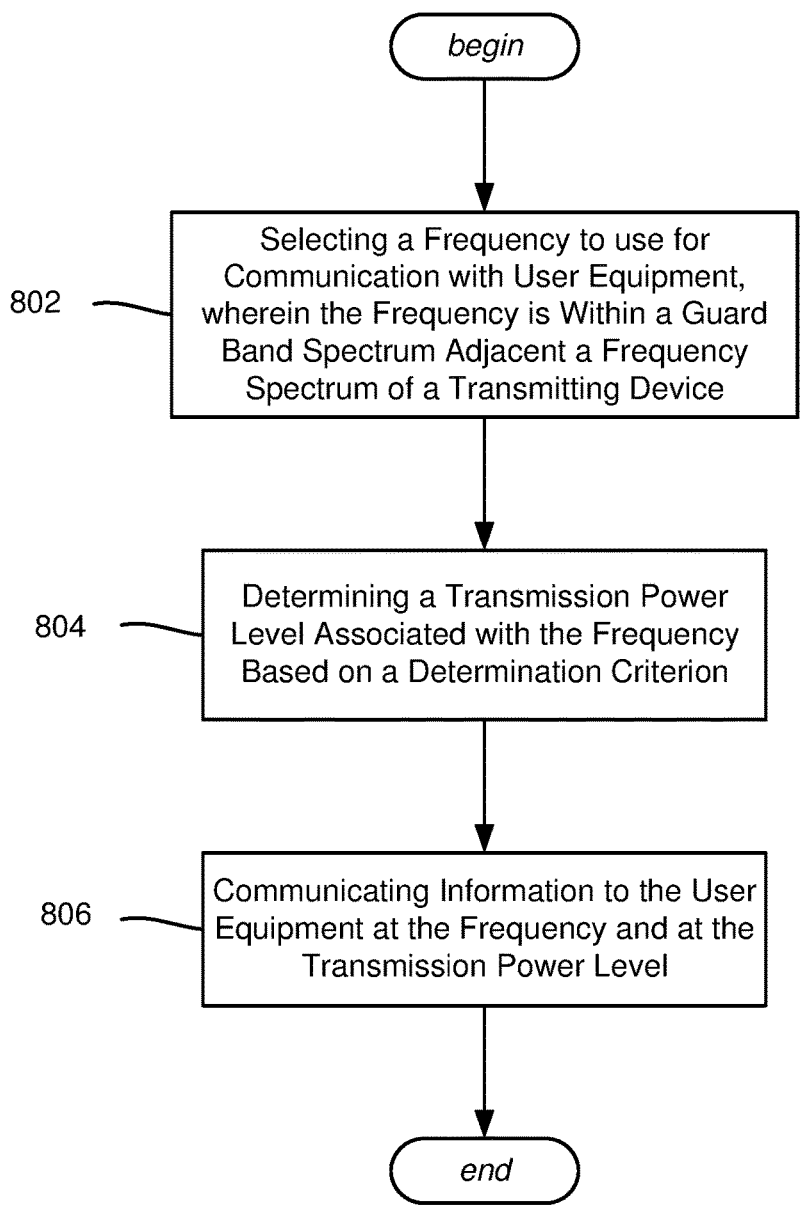
FIG. 8 illustrates an example flow diagram of aspects of network device operations, in accordance with various aspects and implementations of the subject disclosure.

One or more aspects, exemplified in example operations of FIG. 8, comprise selecting, by a network device comprising a processor, a frequency to use for communication with a user equipment, wherein the frequency is within a guard band spectrum adjacent a frequency spectrum of a transmitting device (operation 802). Aspects comprise determining, by the network device, a transmission power level associated with the frequency based on a determination criterion (operation 804), and communicating, by the network device, information to the user equipment at the frequency and at the transmission power level (operation 806).

Selecting the frequency may be based on evaluating a defined quality of service level of the information to be communicated to the user equipment. The frequency may be a first frequency, and determining the transmission power level may comprise determining the transmission power level based on a difference of the first frequency relative to a second frequency in the frequency spectrum of the transmitting device. Determining the transmission power level based on the difference of the first frequency relative to the second frequency may comprise reducing the power transmission level as a relative frequency difference of the first frequency relative to the second frequency becomes smaller.

Determining the transmission power level may comprise determining the transmission power level based on noise measurement data. Aspects may comprise obtaining, by the network device, the noise measurement data at a location from which the communicating the information by the network device occurs. Other aspects may comprise obtaining, by the network device, the noise measurement data at a location from which the communicating the information occurs and from adjacent site data adjacent to the location.

Communicating the information to the user equipment at the frequency and at the transmission power level may comprise transmitting a one-way data transmission from the network device to the user equipment. Aspects may comprise transmitting, by the network device, frequency data and power level data to the user equipment for use by the user equipment in transmitting other information back to the network device.

Communicating the information to the user equipment at the frequency and at the transmission power level may comprise transmitting video data to the user equipment. Communicating the information to the user equipment at the frequency at the transmission power level may comprise transmitting a software update to the user equipment. Communicating the information to the user equipment at the frequency at the transmission power level may comprise transmitting traffic information or weather information to the user equipment. Communicating the information to the user equipment at the frequency at the transmission power level may comprise transmitting a text message to the user equipment.

Figure 9:
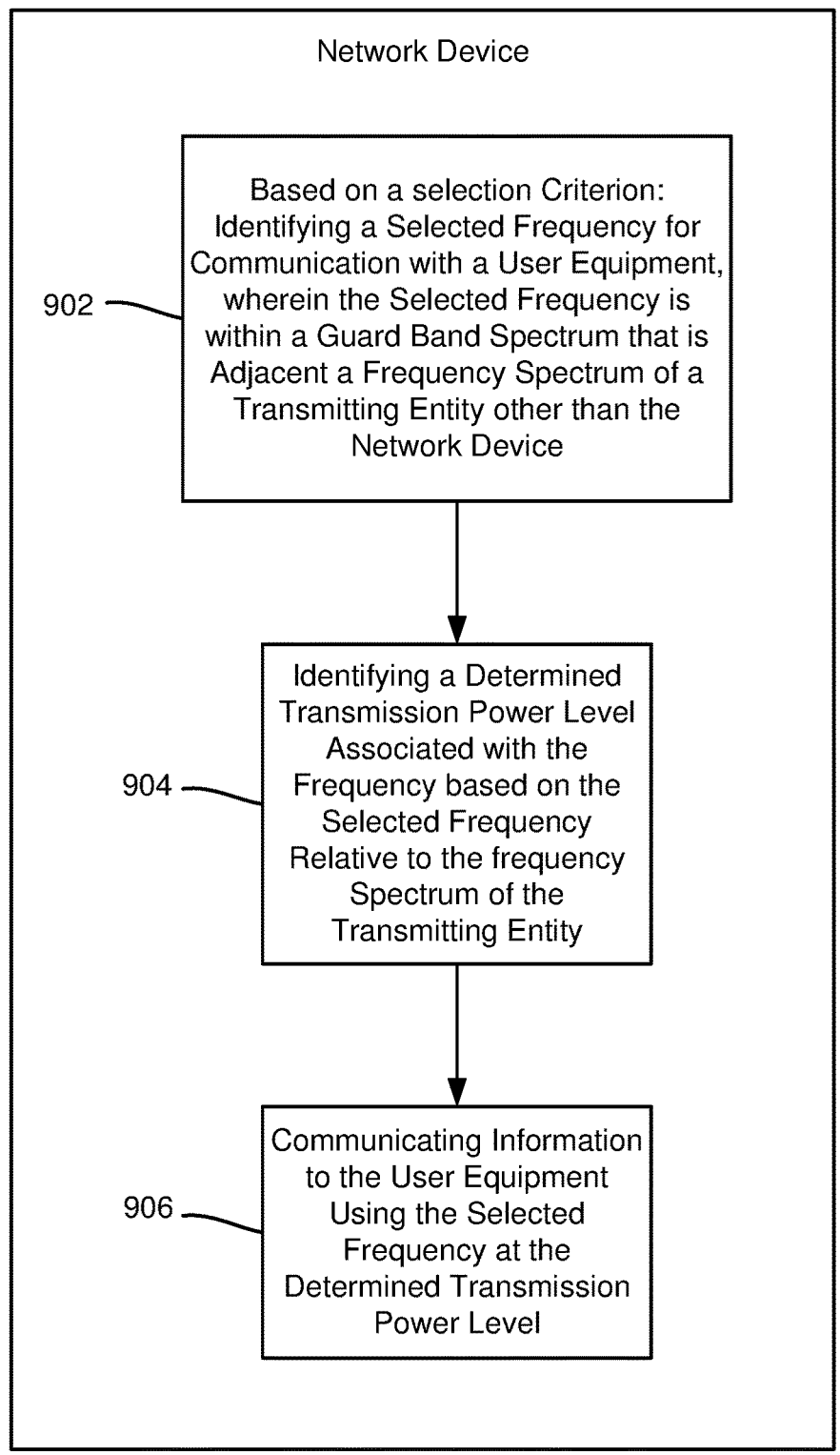
FIG. 9 illustrates an example block diagram of aspects of a network device, in accordance with various aspects and implementations of the subject disclosure.

One or more aspects, represented in FIG. 9, such as in a network device comprising a processor and a memory that stores executable instructions that, when executed by the processor, facilitate performance of operations, are exemplified in operations 902, 904 and 906. Operation 902 is based on a selection criterion, and comprises identifying, by a network device, a selected frequency for communication with a user equipment, wherein the selected frequency is within a guard band spectrum that is adjacent a frequency spectrum of a transmitting entity other than the network device. Operation 904 comprises identifying a determined transmission power level associated with the frequency based on the selected frequency relative to the frequency spectrum of the transmitting entity. Operation 906 comprises communicating information to the user equipment using the selected frequency at the determined transmission power level.

Identifying the selected frequency may comprise evaluating a defined quality of service level of the information. Identifying the determined transmission power level may be further based on noise measurement data obtained relative to a site corresponding to the network device. Communicating the information to the user equipment may comprise transmitting at least one of: video data, audio data, software, a data update, traffic information, weather information, a text message or an alert.

Figure 10:
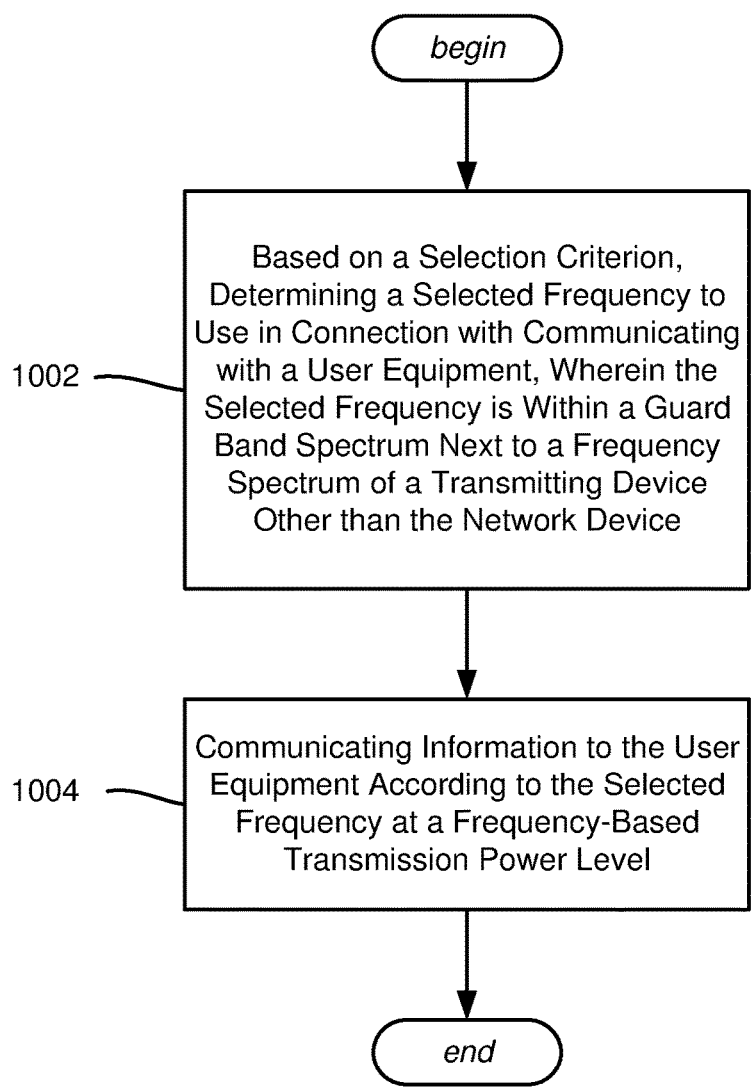
FIG. 10 illustrates an example flow diagram of aspects of network device operations, in accordance with various aspects and implementations of the subject disclosure.

One or more aspects, exemplified as example operations in FIG. 10, comprise, based on a selection criterion, determining a selected frequency to use in connection with communicating with a user equipment, wherein the selected frequency is within a guard band spectrum next to a frequency spectrum of a transmitting device other than the network device (operation 1002). Operation 1004 comprises communicating information to the user equipment according to the selected frequency at a frequency-based transmission power level.

Determining the selected frequency based on the selection criterion may comprise determining the frequency-based transmission power level based on noise data and data indicating how close the selected frequency is to the frequency spectrum of the transmitting device. Determining the selected frequency based on the selection criterion may comprise determining the frequency-based transmission power level based on data indicating how close the selected frequency is to the frequency spectrum of the other transmitting entity, based on noise data, and based on a specified quality of service level for the information.

Figure 11:
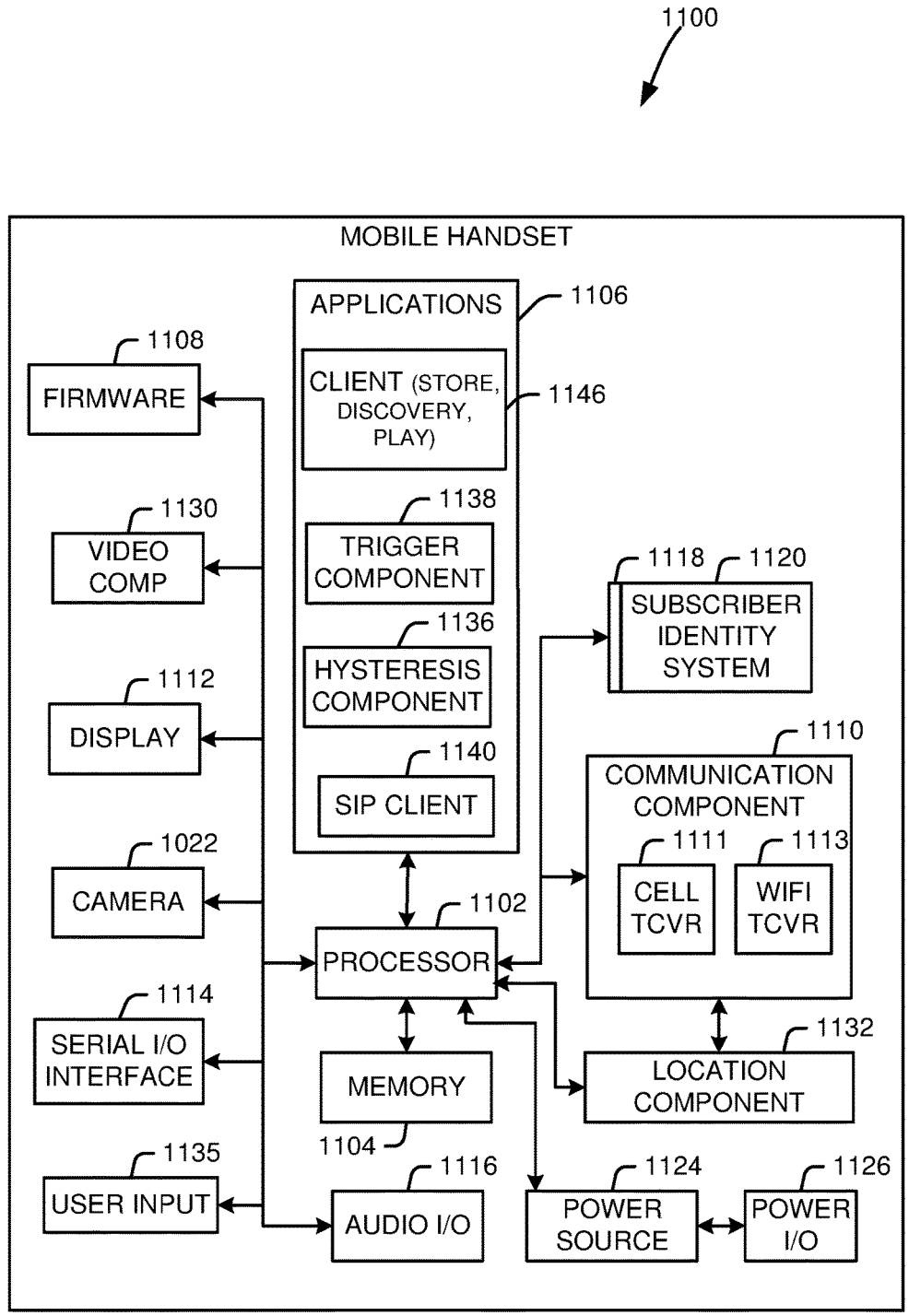
FIG. 11 illustrates an example block diagram of an example mobile handset operable to engage in a system architecture that facilitates wireless communications according to one or more embodiments described herein.

Referring now to FIG. 11, illustrated is an example block diagram of an example mobile handset 1100 operable to engage in a system architecture that facilitates wireless communications according to one or more embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, solid state drive (SSD) or other solid-state storage technology, Compact Disk Read Only Memory (CD ROM), digital video disk (DVD), Blu-ray disk, or other optical disk storage, magnetic cassettes, magnetic tape, magnetic disk storage or other magnetic storage devices, or any other medium which can be used to store the desired information and which can be accessed by the computer. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media The handset includes a processor 1102 for controlling and processing all onboard operations and functions. A memory 1104 interfaces to the processor 1102 for storage of data and one or more applications 1106 (e.g., a video player software, user feedback component software, etc.). Other applications can include voice recognition of predetermined voice commands that facilitate initiation of the user feedback signals. The applications 1106 can be stored in the memory 1104 and/or in a firmware 1108, and executed by the processor 1102 from either or both the memory 1104 or/and the firmware 1108. The firmware 1108 can also store startup code for execution in initializing the handset 1100. A communications component 1110 interfaces to the processor 1102 to facilitate wired/wireless communication with external systems, e.g., cellular networks, VoIP networks, and so on. Here, the communications component 1110 can also include a suitable cellular transceiver 1111 (e.g., a GSM transceiver) and/or an unlicensed transceiver 1113 (e.g., Wi-Fi, WiMax) for corresponding signal communications. The handset 1100 can be a device such as a cellular telephone, a PDA with mobile communications capabilities, and messaging-centric devices. The communications component 1110 also facilitates communications reception from terrestrial radio networks (e.g., broadcast), digital satellite radio networks, and Internet-based radio services networks The handset 1100 includes a display 1112 for displaying text, images, video, telephony functions (e.g., a Caller ID function), setup functions, and for user input. For example, the display 1112 can also be referred to as a "screen" that can accommodate the presentation of multimedia content (e.g., music metadata, messages, wallpaper, graphics, etc.). The display 1112 can also display videos and can facilitate the generation, editing and sharing of video quotes. A serial I/O interface 1114 is provided in communication with the processor 1102 to facilitate wired and/or wireless serial communications (e.g., USB, and/or IEEE 1194) through a hardwire connection, and other serial input devices (e.g., a keyboard, keypad, and mouse). This supports updating and troubleshooting the handset 1100, for example. Audio capabilities are provided with an audio I/O component 1116, which can include a speaker for the output of audio signals related to, for example, indication that the user pressed the proper key or key combination to initiate the user feedback signal. The audio I/O component 1116 also facilitates the input of audio signals through a microphone to record data and/or telephony voice data, and for inputting voice signals for telephone conversations.

The handset 1100 can include a slot interface 1118 for accommodating a SIC (Subscriber Identity Component) in the form factor of a card Subscriber Identity Module (SIM) or universal SIM 1120, and interfacing the SIM card 1120 with the processor 1102. However, it is to be appreciated that the SIM card 1120 can be manufactured into the handset 1100, and updated by downloading data and software.

The handset 1100 can process IP data traffic through the communications component 1110 to accommodate IP traffic from an IP network such as, for example, the Internet, a corporate intranet, a home network, a person area network, etc., through an ISP or broadband cable provider. Thus, VoIP traffic can be utilized by the handset 1100 and IP-based multimedia content can be received in either an encoded or a decoded format.

A video processing component 1122 (e.g., a camera) can be provided for decoding encoded multimedia content. The video processing component 1122 can aid in facilitating the generation, editing, and sharing of video quotes. The handset 1100 also includes a power source 1124 in the form of batteries and/or an AC power subsystem, which power source 1124 can interface to an external power system or charging equipment (not shown) by a power I/O component 1126.

The handset 1100 can also include a video component 1130 for processing video content received and, for recording and transmitting video content. For example, the video component 1130 can facilitate the generation, editing and sharing of video quotes. A location tracking component 1132 facilitates geographically locating the handset 1100. As described hereinabove, this can occur when the user initiates the feedback signal automatically or manually. A user input component 1134 facilitates the user initiating the quality feedback signal. The user input component 1134 can also facilitate the generation, editing and sharing of video quotes. The user input component 1134 can include such conventional input device technologies such as a keypad, keyboard, mouse, stylus pen, and/or touch screen, for example.

Referring again to the applications 1106, a hysteresis component 1136 facilitates the analysis and processing of hysteresis data, which is utilized to determine when to associate with the access point. A software trigger component 1138 can be provided that facilitates triggering of the hysteresis component 1136 when the Wi-Fi transceiver 1113 detects the beacon of the access point. A SIP client 1140 enables the handset 1100 to support SIP protocols and register the subscriber with the SIP registrar server. The applications 1106 can also include a client 1142 that provides at least the capability of discovery, play and store of multimedia content, for example, music.

The handset 1100, as indicated above related to the communications component 1110, includes an indoor network radio transceiver 1113 (e.g., Wi-Fi transceiver). This function supports the indoor radio link, such as IEEE 802.11 (e.g., for a Multimode Handset or Device) 1100. The handset 1100 can accommodate at least satellite radio services through a handset that can combine wireless voice and digital radio chipsets into a single handheld device.

Figure 12:
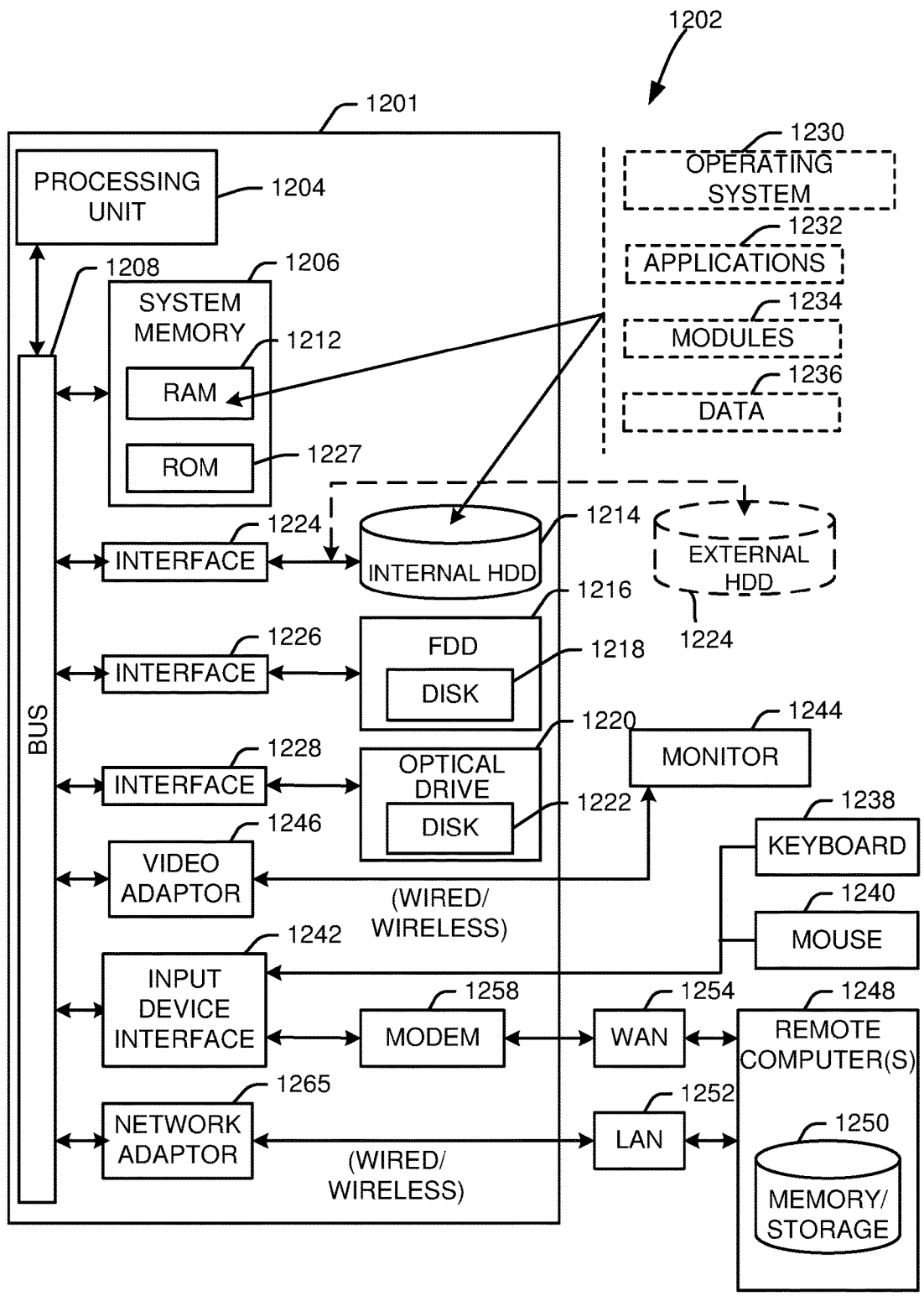
FIG. 12 illustrates an example block diagram of an example computer operable to engage in a system architecture that facilitates wireless communications according to one or more embodiments described herein.

Referring now to FIG. 12, illustrated is an example block diagram of an example computer 1200 operable to engage in a system architecture that facilitates wireless communications according to one or more embodiments described herein. The computer 1200 can provide networking and communication capabilities between a wired or wireless communication network and a server (e.g., Microsoft server) and/or communication device. In order to provide additional context for various aspects thereof, FIG. 12 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Any technology capable of storing information can be considered storage media. By way of example, and not limitation, computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules, or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

The techniques described herein can be applied to any device or set of devices (machines) capable of running programs and processes. It can be understood, therefore, that servers including physical and/or virtual machines, personal computers, laptops, handheld, portable and other computing devices and computing objects of all kinds including cell phones, tablet/slate computers, gaming/entertainment consoles and the like are contemplated for use in connection with various implementations including those exemplified herein. Accordingly, the general purpose computing mechanism described below with reference to FIG. 12 is but one example of a computing device.

In order to provide a context for the various aspects of the disclosed subject matter, FIG. 12 and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules include routines, programs, components, data structures, etc. that perform particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory, by way of illustration, and not limitation, volatile memory 1220 (see below), non-volatile memory 1222 (see below), disk storage 1224 (see below), and memory storage 1246 (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, including single-processor or multiprocessor computer systems, mini-computing devices, mainframe computers, as well as personal computers, hand-held computing devices (e.g., PDA, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 12 illustrates a block diagram of a computing system 1200 operable to execute the disclosed systems and methods in accordance with an embodiment. Computer 1212, which can be, for example, part of the hardware of system 1220, includes a processing unit 1214, a system memory 1216, and a system bus 1218. System bus 1218 couples system components including, but not limited to, system memory 1216 to processing unit 1214. Processing unit 1214 can be any of various available processors. Dual microprocessors and other multiprocessor architectures also can be employed as processing unit 1214.

System bus 1218 can be any of several types of bus structure(s) including a memory bus or a memory controller, a peripheral bus or an external bus, and/or a local bus using any variety of available bus architectures including, but not limited to, Industrial Standard Architecture (ISA), Micro-Channel Architecture (MSA), Extended ISA (EISA), Intelligent Drive Electronics, VESA Local Bus (VLB), Peripheral Component Interconnect (PCI), Card Bus, Universal Serial Bus (USB), Advanced Graphics Port (AGP), Personal Computer Memory Card International Association bus (PC-MCIA), Firewire (IEEE 1294), and Small Computer Systems Interface (SCSI).

System memory 1216 can include volatile memory 1220 and nonvolatile memory 1222. A basic input/output system (BIOS), containing routines to transfer information between elements within computer 1212, such as during start-up, can be stored in nonvolatile memory 1222. By way of illustration, and not limitation, nonvolatile memory 1222 can include ROM, PROM, EPROM, EEPROM, or flash memory. Volatile memory 1220 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1212 can also include removable/non-removable, volatile/non-volatile computer storage media. FIG. 12 illustrates, for example, disk storage 1224. Disk storage 1224 includes, but is not limited to, devices like a magnetic disk drive, floppy disk drive, tape drive, flash memory card, or memory stick. In addition, disk storage 1224 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1224 to system bus 1218, a removable or non-removable interface is typically used, such as interface 1226.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se. In an aspect, tangible media can include non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. For the avoidance of doubt, the term "computer-readable storage device" is used and defined herein to exclude transitory media. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

It can be noted that FIG. 12 describes software that acts as an intermediary between users and computer resources described in suitable operating environment 1200. Such software includes an operating system 1228. Operating system 1228, which can be stored on disk storage 1224, acts to control and allocate resources of computer system 1212. System applications 1230 take advantage of the management of resources by operating system 1228 through program modules 1232 and program data 1234 stored either in system memory 1216 or on disk storage 1224. It is to be noted that the disclosed subject matter can be implemented with various operating systems or combinations of operating systems.

A user can enter commands or information into computer 1212 through input device(s) 1236. As an example, a mobile device and/or portable device can include a user interface embodied in a touch sensitive display panel allowing a user to interact with computer 1212. Input devices 1236 include, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1214 through system bus 1218 by way of interface port(s) 1238. Interface port(s) 1238 include, for example, a serial port, a parallel port, a game port, a universal serial bus (USB), an infrared port, a Bluetooth port, an IP port, or a logical port associated with a wireless service, etc. Output device(s) 1240 and a move use some of the same type of ports as input device(s) 1236.

Thus, for example, a USB port can be used to provide input to computer 1212 and to output information from computer 1212 to an output device 1240. Output adapter 1242 is provided to illustrate that there are some output devices 1240 like monitors, speakers, and printers, among other output devices 1240, which use special adapters. Output adapters 1242 include, by way of illustration and not limitation, video and sound cards that provide means of connection between output device 1240 and system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. Remote computer(s) 1244 can be a personal computer, a server, a router, a network PC, cloud storage, cloud service, a workstation, a microprocessor based appliance, a peer device, or other common network node and the like, and typically includes many or all of the elements described relative to computer 1212.

For purposes of brevity, only a memory storage device 1246 is illustrated with remote computer(s) 1244. Remote computer(s) 1244 is logically connected to computer 1212 through a network interface 1248 and then physically connected by way of communication connection 1250. Network interface 1248 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit-switching networks like Integrated Services Digital Networks (ISDN) and variations thereon, packet switching networks, and Digital Subscriber Lines (DSL). As noted below, wireless technologies may be used in addition to or in place of the foregoing.

Communication connection(s) 1250 refer(s) to hardware/software employed to connect network interface 1248 to bus 1218. While communication connection 1250 is shown for illustrative clarity inside computer 1212, it can also be external to computer 1212. The hardware/software for connection to network interface 1248 can include, for example, internal and external technologies such as modems, including regular telephone grade modems, cable modems and DSL modems, ISDN adapters, and Ethernet cards.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media, device readable storage devices, or machine readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point (AP)," "base station," "NodeB," "evolved Node B (eNodeB)," "home Node B (HNB)," "home access point (HAP)," "cell device," "sector," "cell," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can include packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of systems and methods illustrative of the disclosed subject matter. It is, of course, not possible to describe every combination of components or methods herein. One of ordinary skill in the art may recognize that many further combinations and permutations of the disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

While the various embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope of the various embodiments.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the invention is not to be limited to any single implementation, but rather is to be construed in breadth, spirit and scope in accordance with the appended claims.

What is claimed is:
1. A method, comprising:
 selecting, by a network device comprising a processor, a first frequency to use for communication with a user equipment, wherein the first frequency is within a guard band spectrum adjacent a frequency spectrum of a frequency division duplex dedicated channel or carrier or a time division duplex dedicated channel or carrier;

determining, by the network device, a transmission power level associated with the first frequency based on a determination criterion, wherein the determining the transmission power level comprises determining the transmission power level based on a difference of the first frequency relative to a second frequency in the frequency spectrum of a transmitting device; and communicating, by the network device, information to the user equipment at the first frequency and at the transmission power level.

2. The method of claim 1, wherein the selecting the first frequency is based on evaluating a defined quality of service level of the information to be communicated to the user equipment.

3. The method of claim 1, wherein the determining the transmission power level based on the difference of the first frequency relative to the second frequency comprises reducing the power transmission level as a relative frequency difference of the first frequency relative to the second frequency becomes smaller.

4. The method of claim 1, wherein the determining the transmission power level comprises determining the transmission power level further based on noise measurement data.

5. The method of claim 4, further comprising, obtaining, by the network device, the noise measurement data at a location from which the communicating the information by the network device occurs.

6. The method of claim 4, further comprising, obtaining, by the network device, the noise measurement data at a location from which the communicating the information occurs and from adjacent site data adjacent to the location.

7. The method of claim 1, wherein the communicating the information to the user equipment at the first frequency and at the transmission power level comprises transmitting a one-way data transmission from the network device to the user equipment.

8. The method of claim 1, further comprising, transmitting, by the network device, frequency data and power level data to the user equipment for use by the user equipment in transmitting other information back to the network device.

9. The method of claim 1, wherein the communicating the information to the user equipment at the first frequency and at the transmission power level comprises transmitting video data to the user equipment.

10. The method of claim 1, wherein the communicating the information to the user equipment at the first frequency at the transmission power level comprises transmitting a software update to the user equipment.

11. The method of claim 1, wherein the communicating the information to the user equipment at the first frequency at the transmission power level comprises transmitting traffic information or weather information to the user equipment.

12. The method of claim 1, wherein the communicating the information to the user equipment at the first frequency at the transmission power level comprises transmitting a text message to the user equipment.

13. A system, comprising:
a processor; and a memory that stores executable instructions that, when executed by the processor, facilitate performance of operations, the operations comprising:

based on a selection criterion, identifying, by a network device, a selected first frequency for communication with a user equipment, wherein the selected first frequency is within a guard band spectrum that is adjacent a frequency spectrum of a transmitting entity other than the network device;

identifying a determined transmission power level associated with the selected first frequency based on the selected first frequency relative to the frequency spectrum of the transmitting entity, wherein the identifying the determined transmission power level comprises identifying the determined transmission power level based on a difference of the selected first frequency relative to a second frequency in the frequency spectrum of the transmitting entity; and communicating information to the user equipment using the selected first frequency at the determined transmission power level.

14. The system of claim 13, wherein the identifying the selected first frequency comprises evaluating a defined quality of service level of the information.

15. The system of claim 13, wherein the identifying the determined transmission power level is further based on noise measurement data obtained relative to a site corresponding to the network device.

16. The system of claim 13, wherein the communicating the information to the user equipment comprises transmitting at least one of: video data, audio data, software, a data update, traffic information, weather information, a text message or an alert.

17. A machine-readable storage medium, comprising executable instructions that, when executed by a processor of a network device, facilitate performance of operations, the operations comprising:

based on a selection criterion, determining a selected frequency to use in connection with communicating with a user equipment, wherein the selected frequency is within a guard band spectrum next to a frequency spectrum of a transmitting device other than the network device wherein the determining the selected frequency based on the selection criterion comprises determining a frequency-based transmission power level based on a difference of the selected frequency relative to a different frequency in the frequency spectrum of the transmitting device; and communicating information to the user equipment according to the selected frequency at the frequency-based transmission power level.

18. The machine-readable storage medium of claim 17, wherein the determining the selected frequency based on the selection criterion comprises determining the frequency-based transmission power level further based on noise data.

19. The machine-readable storage medium of claim 17, wherein the determining the selected frequency based on the selection criterion comprises determining the frequency-based transmission power level further based on a specified quality of service level for the information.

20. The machine-readable storage medium of claim 17, wherein the determining the selected frequency based on the selection criterion is further based on evaluating a defined quality of service level of information to be communicated to the user equipment.

* * * * *